United States Patent
Hu et al.

(10) Patent No.: US 11,909,072 B2
(45) Date of Patent: Feb. 20, 2024

(54) ELECTRODE ASSEMBLY AND BATTERY

(71) Applicant: NINGDE AMPEREX TECHNOLOGY LIMITED, Ningde (CN)

(72) Inventors: Hongwei Hu, Ningde (CN); Jiao Tian, Ningde (CN); Yujiang Xu, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 358 days.

(21) Appl. No.: 17/219,754

(22) Filed: Mar. 31, 2021

(65) Prior Publication Data

US 2021/0226305 A1     Jul. 22, 2021

Related U.S. Application Data

(63) Continuation of application No. PCT/CN2020/073339, filed on Jan. 20, 2020.

(51) Int. Cl.
*H01M 50/538* (2021.01)
*H01M 50/534* (2021.01)
*H01M 50/547* (2021.01)
*H01M 10/04* (2006.01)

(52) U.S. Cl.
CPC ..... *H01M 50/538* (2021.01); *H01M 10/0431* (2013.01); *H01M 50/534* (2021.01); *H01M 50/547* (2021.01)

(58) Field of Classification Search
CPC ............. H01M 50/538; H01M 50/534; H01M 50/547; H01M 10/0431
See application file for complete search history.

(56) References Cited

U.S. PATENT DOCUMENTS

2010/0068616 A1* 3/2010 Uh ...................... H01M 50/579
                                                          429/163
2014/0079971 A1 3/2014 Huang

FOREIGN PATENT DOCUMENTS

| CN | 101106203 A | 1/2008 |
| CN | 101615698 A | 12/2009 |
| CN | 101714624 A | 5/2010 |
| CN | 101867069 A | 10/2010 |
| CN | 202487691 U | 10/2012 |

(Continued)

OTHER PUBLICATIONS

CN209607862MT (Year: 2019).*

(Continued)

*Primary Examiner* — Alexander Usyatinsky
(74) *Attorney, Agent, or Firm* — Morgan, Lewis & Bockius LLP

(57) ABSTRACT

An electrode assembly, including a first electrode plate, a second electrode plate, and a separator. The electrode assembly is formed by winding the first electrode plate, the separator, and the second electrode plate. A first tab formed by a plurality of first tab units and a second tab formed by a plurality of second tab units are disposed on the first electrode plate, and a third tab formed by a plurality of third tab units is disposed on the second electrode plate. The electrode assembly is provided with a multi-tab structure to achieve purposes of enhancing a current-carrying capacity of the battery and reducing a temperature rise.

17 Claims, 10 Drawing Sheets

(56) References Cited

FOREIGN PATENT DOCUMENTS

| | | | |
|---|---|---|---|
| CN | 103259050 A | | 8/2013 |
| CN | 204885269 U | | 12/2015 |
| CN | 107666006 | * | 2/2018 |
| CN | 107666006 A | | 2/2018 |
| CN | 10833641 | * | 7/2018 |
| CN | 108336416 A | | 7/2018 |
| CN | 108598354 A | | 9/2018 |
| CN | 104425848 | * | 12/2018 |
| CN | 108987655 | * | 12/2018 |
| CN | 108987655 A | | 12/2018 |
| CN | 110265618 A | | 9/2019 |
| CN | 209592175 U | | 11/2019 |
| CN | 209607862 | * | 11/2019 |
| CN | 209607862 U | | 11/2019 |
| JP | 2019040720 A | | 3/2019 |
| KR | 20150030537 A | | 3/2015 |

OTHER PUBLICATIONS

CN 104425848 MT (Year: 2018).*
International Search Report and Written Opinion, PCTCN2020073339, dated Oct. 21, 2020, 9 pgs.—No Translation Available.
Ningde New Energy Technology Co. Ltd., First Office Action, CN202080004326.5, dated Oct. 29, 2021, 20 pgs.
Ningde New Energy Technology Co. Ltd., Second Office Action, CN202080004326.5, dated Dec. 28, 2021, 12 pgs.

* cited by examiner

ELECTRODE ASSEMBLY AND BATTERY

CROSS-REFERENCE TO RELATED APPLICATIONS

This application is a continuation application of PCT Application No. PCT/CN2020/073339, filed on Jan. 20, 2020 and entitled "ELECTRODE ASSEMBLY AND BATTERY", which is incorporated herein by reference in its entirety.

TECHNICAL FIELD

This application relates to the field of batteries, and in particular, to an electrode assembly and a battery that contains the electrode assembly.

BACKGROUND

The application of 5G is accompanied with higher requirements imposed by consumers on battery performance of a portable electronic product such as a smart phone and a tablet computer. Existing batteries have a problem of high temperature rise in both the battery and the integrated electronic product, and the performance of the battery and the electronic product may deteriorate if the temperature rise is too high. The existing battery adopts a two-tab structure, which does not improve an overall current-carrying capacity of the battery, and therefore, the temperature rise of the battery and the integrated electronic product is still relatively high.

SUMMARY

In view of the foregoing situation, it is necessary to provide an electrode assembly capable of increasing a current-carrying capacity of a battery and reducing a temperature rise, and to provide a battery containing the electrode assembly.

This application provides an electrode assembly, including a first electrode plate, a second electrode plate, and a separator. A polarity of the second electrode plate is opposite to a polarity of the first electrode plate, and the separator is disposed between the first electrode plate and the second electrode plate. The electrode assembly is formed by winding the first electrode plate, the separator, and the second electrode plate. A plurality of first tab units and a plurality of second tab units are disposed on the first electrode plate, and a plurality of third tab units are disposed on the second electrode plate. In a thickness direction of the electrode assembly, the plurality of first tab units are stacked to form a first tab, the plurality of second tab units are stacked to form a second tab, and the plurality of third tab units are stacked to form a third tab. The three tabs may be configured as two positive tabs and one negative tab, or two negative tabs and one positive tab. The plurality of tabs are connected in parallel to shunt a current to reduce a temperature rise of the electrode assembly.

In some embodiments, in the thickness direction of the electrode assembly, projections of the first tab, the second tab, and the third tab on a projection plane perpendicular to the thickness direction of the electrode assembly do not overlap, so that the electrode assembly exhibits a three-tab structure exteriorly.

Further, the first electrode plate includes a plurality of first winding units. The plurality of first tab units and the plurality of second tab units are distributed on the plurality of first winding units. The second electrode plate includes a plurality of second winding units. The plurality of third tab units are distributed on the plurality of second winding units. Each first winding unit includes a first straight portion and a first bent portion. Each second winding unit includes a second straight portion and a second bent part. A plurality of first straight portions and a plurality of the second straight portions are alternately stacked.

Further, two adjacent first tab units are interspaced with a layer of the first straight portion containing no first tab unit, and the first straight portion containing no first tab unit is defined as a spacer layer, thereby avoiding a too short distance between the first tab units.

In some embodiments, the second tab units are disposed on the spacer layers. In other words, the first tab units are disposed on a first winding unit different from that on which the second tab units are disposed.

In some embodiments, the electrode assembly includes a winding initiation end. The winding initiation end divides the electrode assembly into a first part and a second part in the thickness direction of the electrode assembly. The plurality of first tab units are disposed in the first part, and the plurality of second tab units are disposed in the second part, thereby increasing a spacing between the first tab and the second tab.

In some embodiments, one first tab unit and one second tab unit may be disposed on at least one first winding unit.

In some embodiments, two adjacent third tab units are interspaced with at least one second winding unit to increase a spacing between the adjacent third tab units.

In some embodiments, one third tab unit may also be disposed on each second winding unit.

In a length direction of the electrode assembly, the first tab units are located at a first end of the electrode assembly, and the second tab units are located at a second end of the electrode assembly. Therefore, in the length direction of the electrode assembly, the first tab extends from the first end of the electrode assembly, and the second tab extends from the second end of the electrode assembly.

In some embodiments, the electrode assembly includes a tab plate, the first tab units being configured as a first end of the tab plate, the second tab units being configured as a second end of the tab plate, the tab plate is disposed on the first winding unit, and the first end and the second end of the tab plate extend from the first winding unit. The disposition of the tab plate is conducive to simplifying an installation process of the first tab and the second tab.

In some embodiments, the plurality of first tab units, the plurality of second tab units, and the first electrode plate are integrally formed, and the plurality of third tab units and the second electrode plate are integrally formed.

In some embodiments, a plurality of fourth tab units are further disposed on the first electrode plate or the second electrode plate, and the plurality of fourth tab units are stacked in the thickness direction of the electrode assembly to form a fourth tab. The disposition of the fourth tab can further shunt the current and enhance the current-carrying capacity of the electrode assembly.

Further, in a length direction of the electrode assembly, the third tab is located at the first end of the electrode assembly, and the fourth tab is located at the second end of the electrode assembly.

In some embodiments, in the thickness direction of the electrode assembly, a projection of the third tab on the projection plane is located between a projection of the first tab and a projection of the second tab.

In some embodiments, at least two electrical connection portions are disposed at an end of the first tab extending from the electrode assembly. The at least two electrical connection portions are interspaced and configured for connection with an external circuit or an electrical appliance. In this way, the first tab is divided into two tabs of identical polarity, thereby further shunting the current and increasing the current-carrying capacity of the electrode assembly.

In some embodiments, a material of the first tab or the third tab is copper, nickel, or nickel-plated copper.

This application further provides a battery, including a housing and an electrode assembly. The electrode assembly is any of the electrode assemblies described above, and the housing accommodates the electrode assembly.

Further, the battery includes a plurality of electrode terminals disposed on an outer surface of the housing, and each electrode terminal is electrically connected to the first tab, the second tab, and the third tab separately.

In the electrode assembly, the first tab, the second tab, and the third tab are formed by winding a plurality of tab units together with the electrode plates. Therefore, the electrode assembly exhibits a multi-tab structure, and shunts the current by using a plurality of parallel-connected tabs, thereby enhancing the current-carrying capacity of the battery and reducing the temperature rise.

REFERENCE NUMERALS

Figure 1:
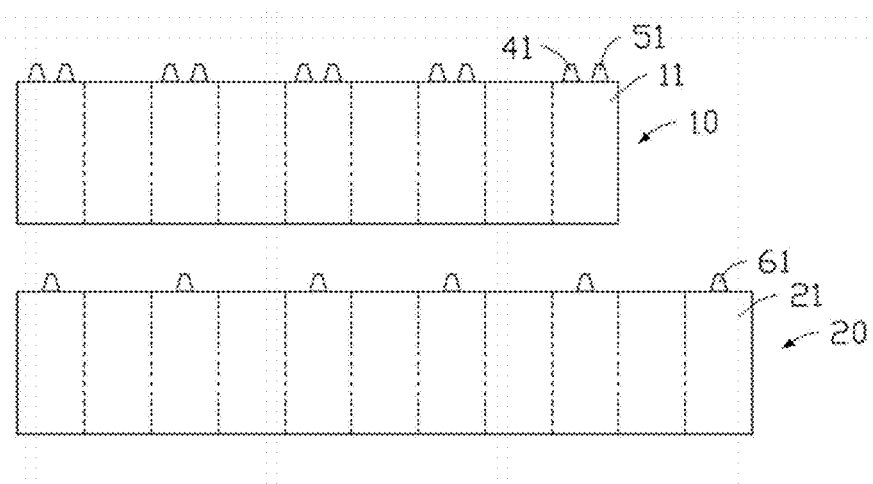
FIG. 1 is an expanded schematic structural diagram of a first electrode plate and a second electrode plate of an electrode assembly according to a first embodiment.

Electrode assembly 100
Winding initiation end 101
First part 102
Second part 103
First end 104
Second end 105
First electrode plate 10
First winding unit 11
First straight portion 111
First bent portion 112
Second electrode plate 20
Second winding unit 21
Second straight portion 211
Second bent portion 212
Separator 30
First tab 40
First tab unit 41
Electrical connection portion 42
Second tab 50
Second tab unit 51
Third tab 60
Third tab unit 61
Fourth tab unit 71
Tab plate 80
First end 81
Second end 82

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. All other embodiments derived by a person of ordinary skill in the art based on the embodiments of this application without making any creative efforts shall fall within the protection scope of this application.

It needs to be noted that an element referred to as being "fixed to" another element may directly exist on the other element or may be fixed to the other element through an intermediate element. An element considered to be "connected to" another element may be directly connected to the other element or may be connected to the other element through an intermediate element. An element considered to be "disposed on" another element may be directly disposed on the other element or may be disposed on the other element through an intermediate element. The terms "vertical", "horizontal", "left", "right" and similar expressions used herein are merely for ease of description.

Unless otherwise defined, all technical and scientific terms used herein have the same meanings as usually understood by a person skilled in the technical field of this application. The terms used in the specification of this application herein are merely intended for describing specific embodiments but are not intended to limit this application. The term "and/or" used herein is intended to include any and all combinations of one or more related items preceding and following the term.

This application provides an electrode assembly, including a first electrode plate, a second electrode plate, and a separator. A polarity of the second electrode plate is opposite to a polarity of the first electrode plate, and the separator is disposed between the first electrode plate and the second electrode plate. The electrode assembly is formed by winding the first electrode plate, the separator, and the second electrode plate. A plurality of first tab units and a plurality of second tab units are disposed on the first electrode plate, and a plurality of third tab units are disposed on the second electrode plate. In a thickness direction of the electrode assembly, the plurality of first tab units are stacked to form a first tab, the plurality of second tab units are stacked to form a second tab, and the plurality of third tab units are stacked to form a third tab.

In the electrode assembly, the first tab, the second tab, and the third tab are formed by winding a plurality of tab units together with the electrode plates. Therefore, the electrode assembly exhibits a multi-tab structure, and shunts the current by using a plurality of parallel-connected tabs, thereby enhancing the current-carrying capacity of the battery and reducing the temperature rise.

The following describes some embodiments of this application in detail. To the extent that no conflict occurs, the following embodiments and the features in the embodiments may be combined with each other.

First Embodiment

Figure 2:
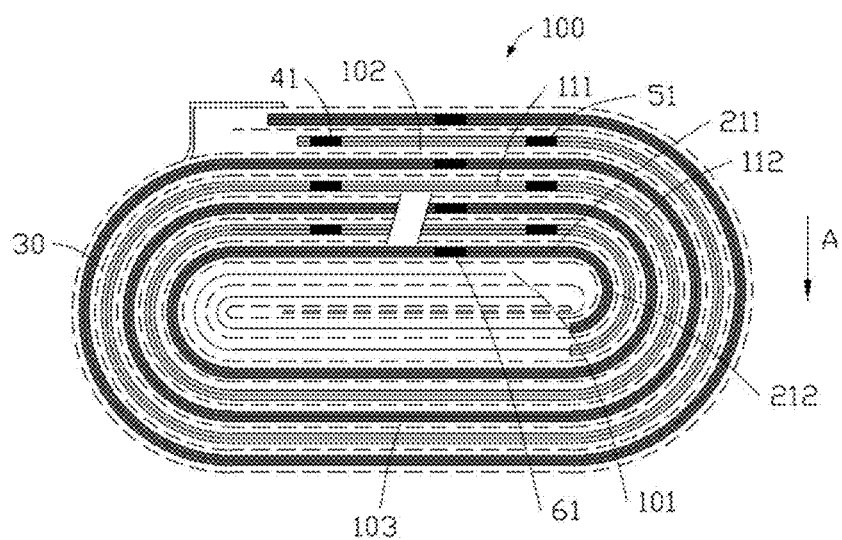
FIG. 2 is a schematic diagram of a jelly-roll structure of an electrode assembly according to a first embodiment.
Figure 3:
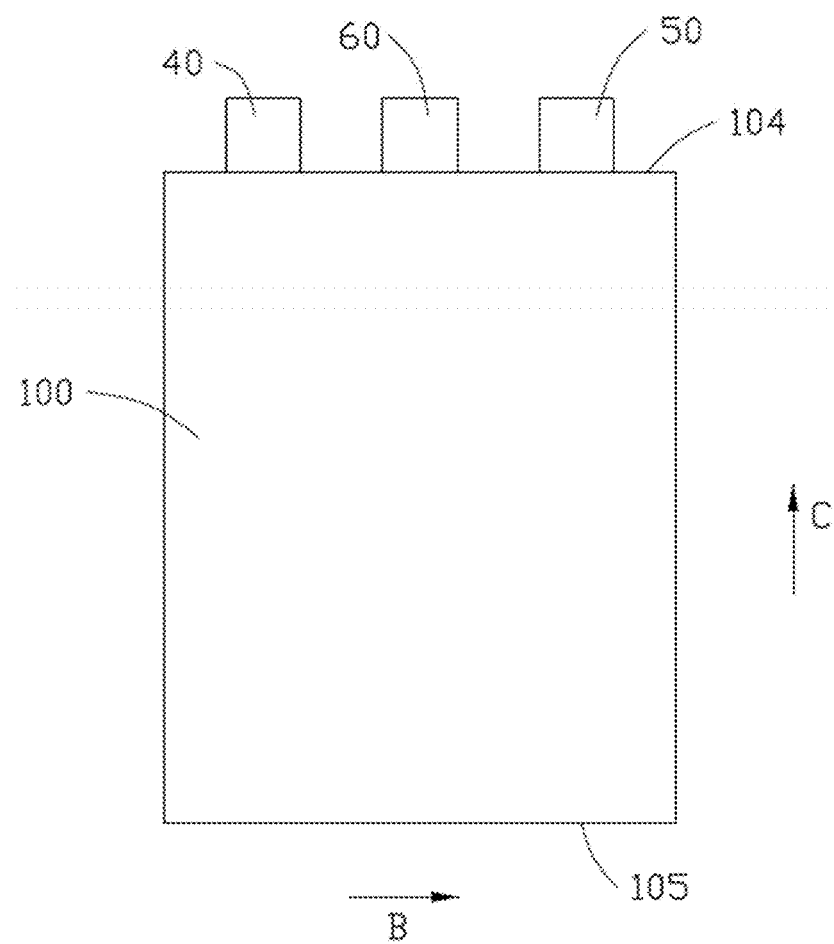
FIG. 3 is a schematic diagram of an exterior structure of an electrode assembly according to a first embodiment.
Figure 17:
FIG. 17 is a schematic diagram of a bent structure of a tab.

Referring to FIG. 1, FIG. 2, and FIG. 3, in an embodiment, the electrode assembly 100 includes a first electrode plate 10, a second electrode plate 20, and a separator 30. A polarity of the second electrode plate 20 is opposite to a polarity of the first electrode plate 10, and the separator 30 is disposed between the first electrode plate 10 and the second electrode plate 20. The electrode assembly 100 is formed by winding the first electrode plate 10, the separator 30, and the second electrode plate 20. A plurality of first tab units 41 and a plurality of second tab units 51 are disposed on the first electrode plate 10, and a plurality of third tab units 61 are disposed on the second electrode plate 20. A direction indicated by an arrow A in FIG. 2 is a thickness direction of the electrode assembly 100. In the thickness direction of the electrode assembly 100, the plurality of first tab units 41 are stacked to form a first tab 40, the plurality of second tab units 51 are stacked to form a second tab 50, and the plurality of third tab units 61 are stacked to form a third tab 60. Referring to FIG. 17, after the plurality of tab units are stacked, the plurality of tab units are uniformly bent to form a tab configured to connect an external adapter or an external circuit.

Further, in the thickness direction of the electrode assembly 100, projections of the first tab 40, the second tab 50, and the third tab 60 on a projection plane perpendicular to the thickness direction of the electrode assembly do not overlap, so that the electrode assembly 100 can exhibit a three-tab structure exteriorly. The three tabs may be configured as two positive tabs and one negative tab, or two negative tabs and one positive tab. The plurality of tabs are connected in parallel to shunt a current to reduce a temperature rise of the electrode assembly. According to an embodiment of this application, a material of the negative tab may be selected from copper, nickel, or nickel-plated copper. The first tab units 41 and the second tab units 51 are disposed on the first tab 10, and the third tab units 61 are disposed on the second tab 20. Therefore, the polarity of the first tab 40 and the second tab 50 is identical to that of the first electrode plate 10, and the polarity of the third tab 60 is identical to that of the second electrode plate 20.

The first electrode plate 10 includes a plurality of first winding units 11. The plurality of first tab units 41 and the plurality of second tab units 51 are distributed on the plurality of first winding units 11. The second electrode plate 20 includes a plurality of second winding units 21. The plurality of third tab units 61 are distributed on the plurality of second winding units 21. Each first winding unit 11 includes a first straight portion 111 and a first bent portion 112. Each second winding unit 21 includes a second straight portion 211 and a second bent portion 212. The plurality of first straight portions 111 and the plurality of second straight portions 211 are alternately stacked. The winding units shown in the expanded schematic structural diagram of the electrode plate in FIG. 1 are merely exemplary. Lengths of the plurality of first and second winding units may be different, depending on an actual winding situation.

Further, one first tab unit 41 and one second tab unit 51 is disposed on at least one first winding unit 11. The electrode assembly 100 includes a winding initiation end 101. In the thickness direction of the electrode assembly 100, the winding initiation end 101 divides the electrode assembly 100 into a first part 102 and a second part 103. Specifically, a part below the winding initiation end 101 is the first part 102, and a part above the winding initiation end 101 is the second part 103.

In the first embodiment, the first winding units 11 are sorted when the first electrode plate 10 is unwound, and both the first tab units 41 and the second tab units 51 are disposed on the odd-numbered first winding units 11. The second winding units 21 are sorted when the second electrode plate 20 is unwound, and the third tab units 61 are disposed on the odd-numbered second winding units 21. Therefore, after a winding process is completed, the first tab units 41, the second tab units 51, and the third tab units 61 are all disposed in the first part 102. In the first part 102, one first tab unit 41 and one second tab unit 51 are disposed on the first straight portion 111 of each layer, and one third tab unit 61 is disposed on the second straight portion 211 of each layer. In this case, the first tab 40, the second tab 50, and the third tab 60 are all located in the first part 102. The plurality of tabs may be bent at a time, thereby reducing complexity of a manufacturing process.

Still referring to FIG. 3, in the thickness direction of the electrode assembly, a projection of the third tab 60 on the projection plane is located between a projection of the first tab 40 and a projection of the second tab 50. Understandably, in other embodiments, the first tab 40 may be located between the third tab 60 and the second tab 50, or the second tab 50 is located between the first tab 40 and the third tab 60, and this application is not limited to the examples given herein. A direction indicated by an arrow C in FIG. 3 is a length direction of the electrode assembly 100. In the first embodiment, the first tab 40, the second tab 50, and the third tab 60 all extend from the first end 104 of the electrode assembly 100 in the length direction. In other embodiments, the first tab 40, the second tab 50, and the third tab 60 may extend from the second end 105 of the electrode assembly 100 in the length direction.

Second Embodiment

Figure 4:
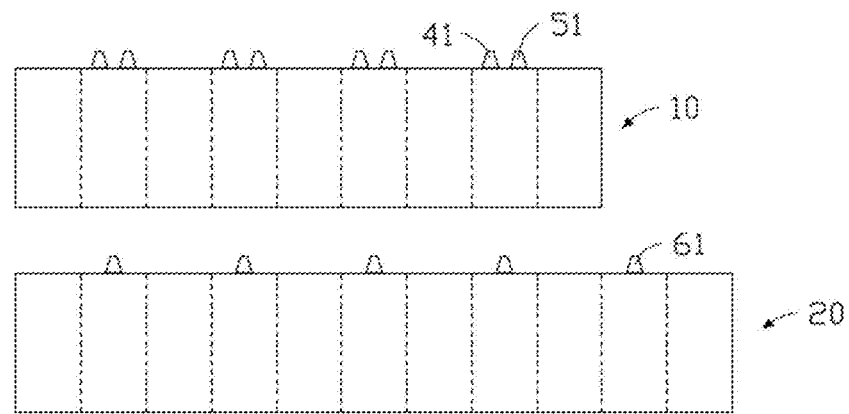
FIG. 4 is an expanded schematic structural diagram of a first electrode plate and a second electrode plate according to a second embodiment.
Figure 5:
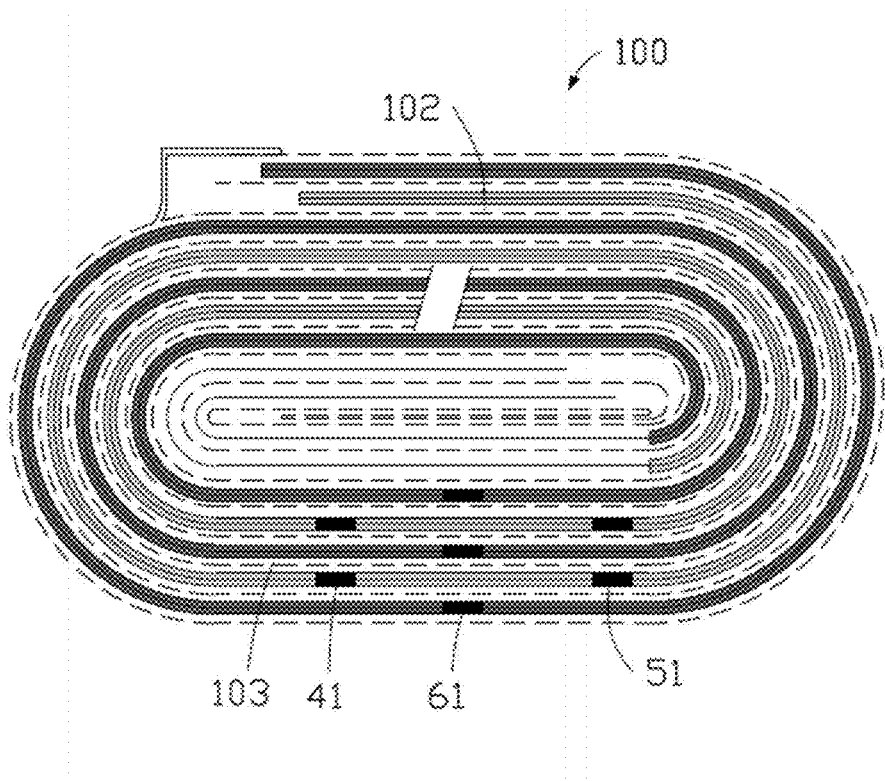
FIG. 5 is a schematic diagram of a jelly-roll structure of an electrode assembly according to a second embodiment.

Referring to FIG. 4 and FIG. 5, an electrode assembly 100 in the second embodiment is almost identical to that in the first embodiment, but differs in: in the second embodiment, the first winding units 11 are sorted when the first electrode plate 10 is unwound, and both the first tab units 41 and the second tab units 51 are disposed on the even-numbered first winding units 11. The second winding units 21 are sorted when the second electrode plate 20 is unwound, and the third tab units 61 are disposed on the even-numbered second winding units 21. Therefore, after a winding process is completed, the first tab units 41, the second tab units 51, and the third tab units 61 are all disposed in the second part 103. Other structures of the electrode assembly 100 in the second embodiment, which are almost identical to those in the first embodiment, are omitted herein.

Understandably, in another optional embodiment, the first tab units 41 are disposed on the odd-numbered first winding units 11, and the second tab units 51 are disposed on the even-numbered first winding units 11. In this case, the plurality of first tab units 41 are disposed in the first part 102, and the plurality of second tab units 51 are disposed in the second part 103. This increases a spacing between the first tab 40 and the second tab 50, avoids interference between the first tab 40 and the second tab 50 in a manufacturing or bending process, and simplifies the manufacturing. In this case, the third tab units 61 may be disposed in the first part 102 or the second part 103, and may be disposed in both the first part 102 and the second part 103.

Third Embodiment

Figure 6:
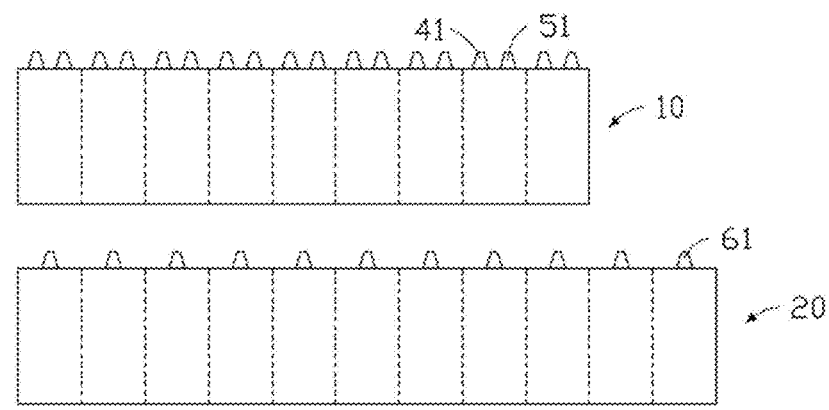
FIG. 6 is an expanded schematic structural diagram of a first electrode plate and a second electrode plate according to a third embodiment.
Figure 7:
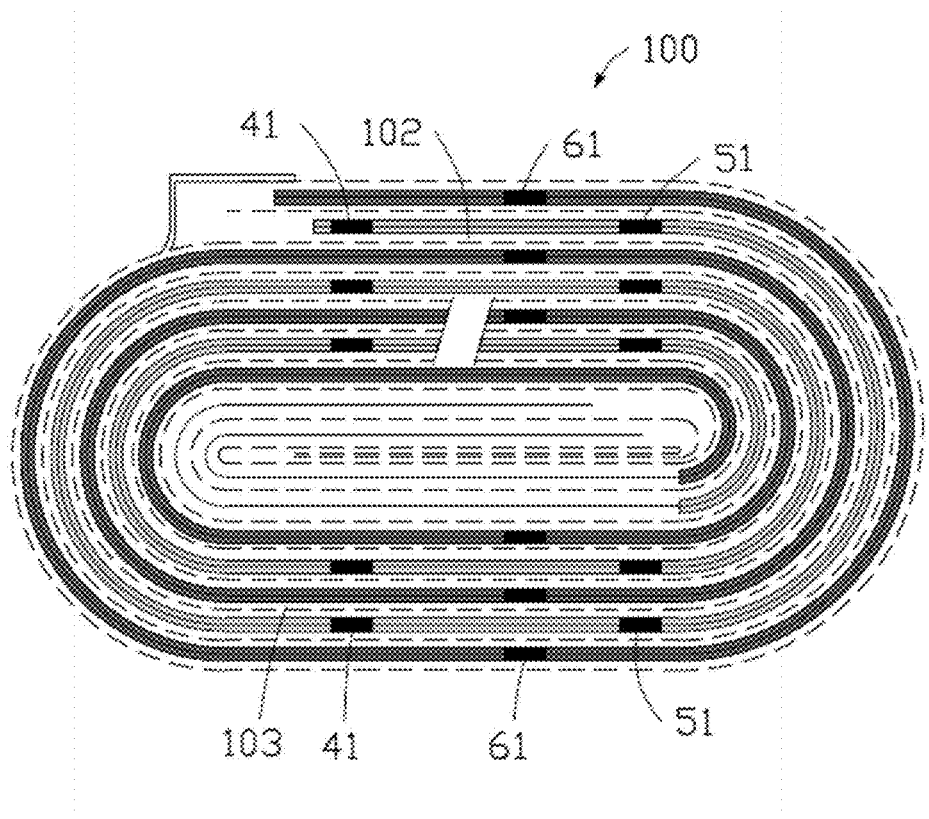
FIG. 7 is a schematic diagram of a jelly-roll structure of an electrode assembly according to a third embodiment.

Referring to FIG. 6 and FIG. 7, an electrode assembly 100 in the third embodiment is almost identical to that in the first embodiment, but differs in: in the third embodiment, one first tab unit 41 and one second tab unit 51 are disposed on each first winding unit 11, and one third tab unit 61 is disposed on each second winding unit 21. In this case, the first tab unit 41, the second tab unit 51, and the third tab unit 61 are disposed on both the first part 102 and the second part 103 of the electrode assembly 100. A thickness of the first tab 40, the second tab 50, and the third tab 60 is increased, and an internal resistance of the electrode assembly 100 is reduced effectively. Other structures of the electrode assembly 100 in the third embodiment, which are almost identical to those in the first embodiment, are omitted herein.

Fourth Embodiment

Figure 8:
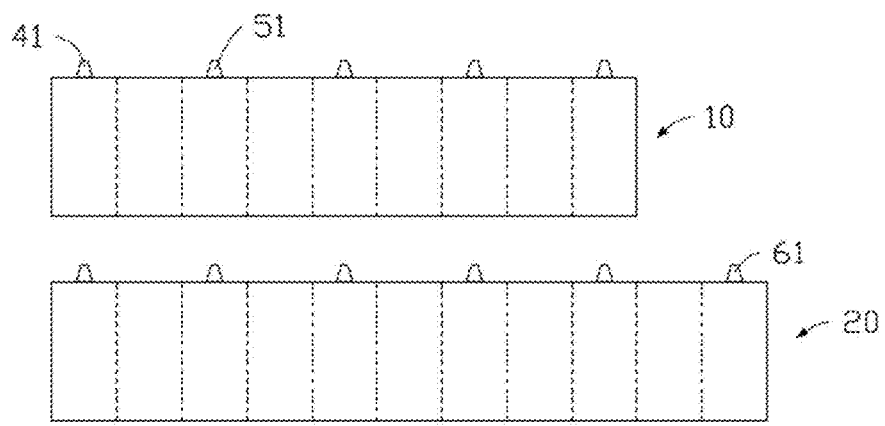
FIG. 8 is an expanded schematic structural diagram of a first electrode plate and a second electrode plate according to a fourth embodiment.
Figure 9:
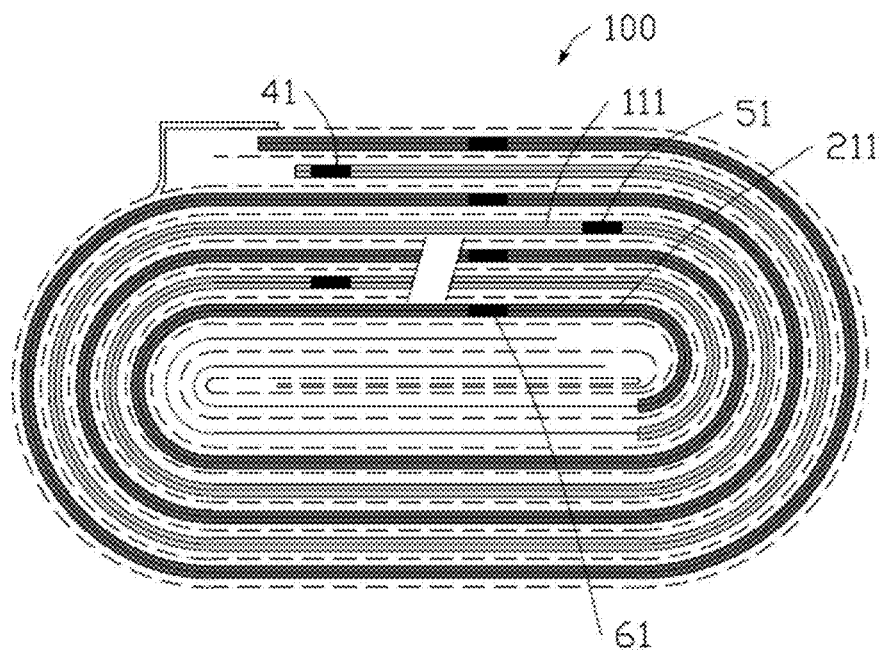
FIG. 9 is a schematic diagram of a jelly-roll structure of an electrode assembly according to a fourth embodiment.

Referring to FIG. 8 and FIG. 9, an electrode assembly 100 in the fourth embodiment is almost identical to that in the first embodiment, but differs in: in the fourth embodiment, two adjacent first tab units 41 are interspaced with a layer of the first straight portion 111 containing no first tab unit 41, and the first straight portion 111 containing no first tab unit 41 is defined as a spacer layer. The second tab units 51 are disposed on the spacer layers. In other words, the first tab units 41 are disposed on a first winding unit 11 different from that on which the second tab units 51 are disposed. On the one hand, this disposition manner is suitable for a circumstance in which the size of the electrode assembly 100 is relatively small in a width direction (the direction indicated by an arrow B in FIG. 2), and can prevent the first tab units 41 from being too close to the second tab units 51, and improve manufacturability of the electrode assembly 100. On the other hand, with the disposed spacer layer, it is prevented that heat dissipation performance of the tabs is affected by a too short spacing between the plurality of tab units.

From a perspective of FIG. 9, the first tab units 41 are roughly disposed on the left side on the first layer of first straight portion 111, and the second tab units 51 are roughly disposed on the right side on the spacer layer. The third tab units 61 are roughly disposed in the middle of the second straight portion 211. In addition, in the first part 102 of the electrode assembly 100, one third tab unit 61 is disposed on each layer of second straight portion 211, so that the third tab 60 is located between the first tab 40 and the second tab 50. In the fourth embodiment, the first tab units 41, the second tab units 51, and the third tab units 61 are all disposed in the first part 102. In other embodiments, the first tab units 41, the second tab units 51, and the third tab units 61 may also be disposed in the second part 103, or disposed in both the first part 102 and the second part 103. The third tab units 61 may also be disposed at a lateral position of the second straight portion, so that the first or second tab is in a middle position. Understandably, a quantity of the first/second/third tab units may be set according to actual product requirements, and this application is not limited thereto.

In another optional embodiment, two adjacent third tab units 61 are interspaced with at least one second winding unit 21. As seen from the thickness direction of the electrode assembly 100, two adjacent third tab units 61 are interspaced with at least one layer of second straight portion 211 to increase a spacing between the adjacent third tab units 61.

Fifth Embodiment

Figure 10:
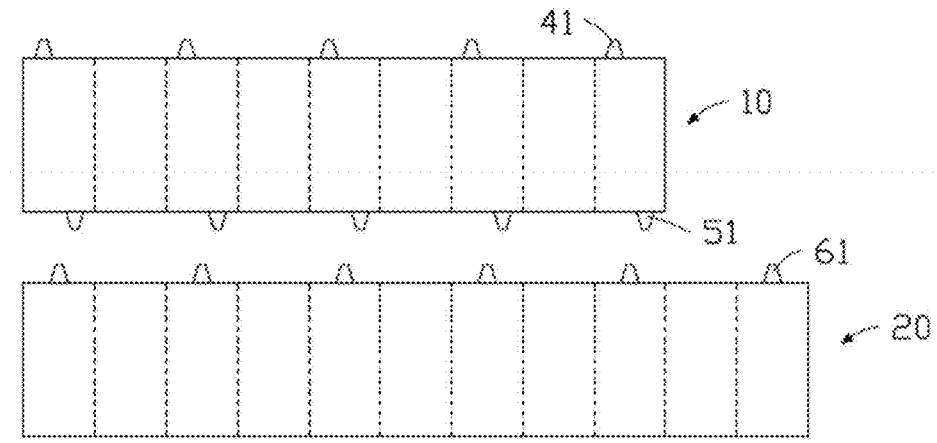
FIG. 10 is an expanded schematic structural diagram of a first electrode plate and a second electrode plate according to a fifth embodiment.
Figure 11:
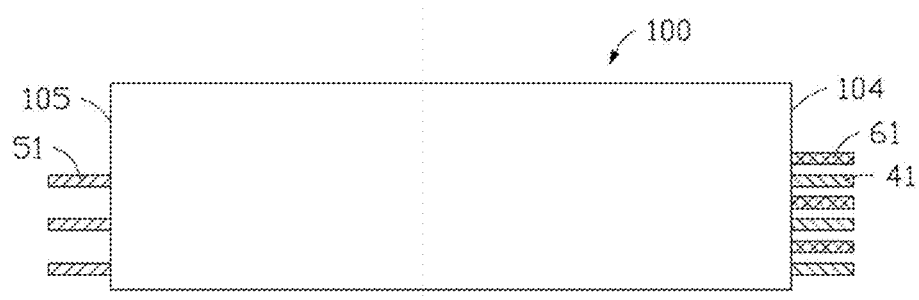
FIG. 11 is a schematic structural diagram of a lateral surface of an electrode assembly according to a fifth embodiment.
Figure 12:
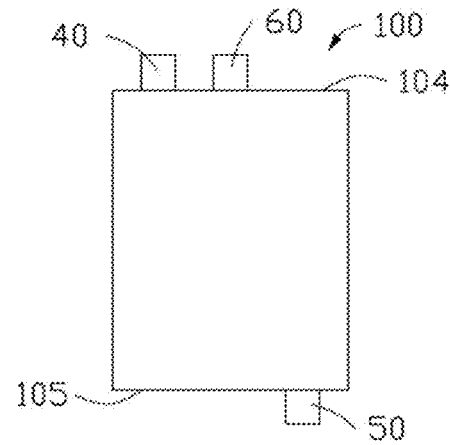
FIG. 12 is a schematic diagram of an exterior structure of an electrode assembly according to a fifth embodiment.

Referring to FIG. 10, FIG. 11, and FIG. 12, an electrode assembly 100 in the fifth embodiment is almost identical to that in the first embodiment, but differs in: in the fifth embodiment, in a length direction of the electrode assembly 100, the first tab units 41 are located at a first end 104 of the electrode assembly 100, and the second tab units 51 are located at a second end 105 of the electrode assembly 100. Therefore, in the length direction of the electrode assembly 100, the first tab 40 extends from the first end 104 of the electrode assembly 100, and the second tab 50 extends from the second end 105 of the electrode assembly 100. In this embodiment, the third tab units 61 may be disposed at the first end 104 or the second end 105. FIG. 12 shows an example in which the third tab 60 extends from the first end 104, but the example does not limit the position of the third tab 60.

Further, the plurality of first tab units 41, the plurality of second tab units 51, and the first electrode plate 10 are integrally formed, and the plurality of third tab units 61 and the second electrode plate 20 are integrally formed. Specifically, a raw material used to manufacture the first electrode plate 10 may be cut so that the first tab units 41 and the second tab units 51 are formed on the first electrode plate 10. A raw material used to manufacture the second electrode plate 20 may be cut so that the third tab units 61 are formed on the second electrode plate 20.

Figure 18:
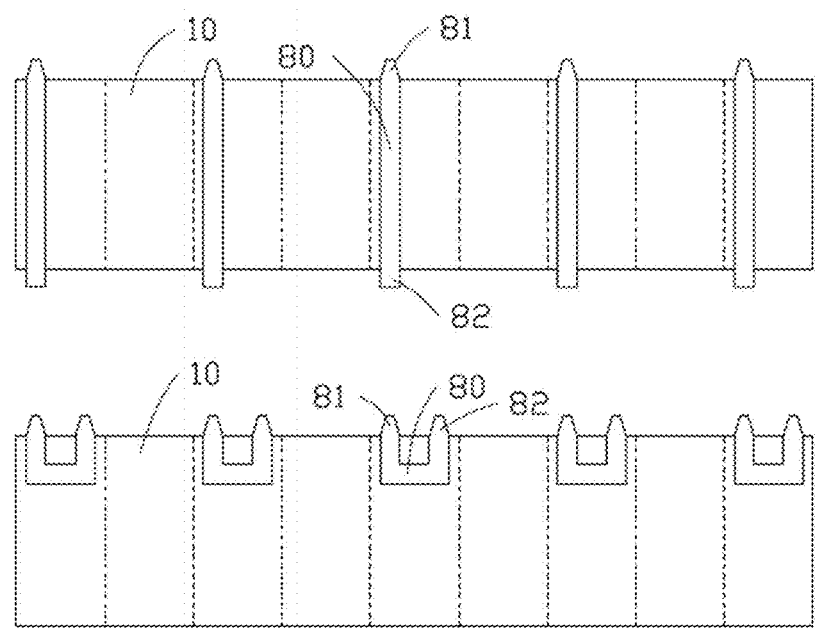
FIG. 18 is a schematic structural diagram of a tab plate and a first electrode plate.

In some embodiments, referring to FIG. 18, the electrode assembly 100 includes a tab plate 80. The first tab units 41 are the first end 81 of the tab plate 80, and the second tab units 51 are the second end 82. The tab plate 80 is disposed on the first winding unit 11 of the first electrode plate 10, and the first end 81 and the second end 82 of the tab plate 80 extend from the first winding unit 11. Specifically, the tab plate 80 is roughly long-strip-shaped. A length of the tab plate 80 is greater than a length of the electrode assembly 100. Therefore, the tab plate 80 can run through the electrode assembly 100. The first tab 40 extends from the first end 104 of the electrode assembly 100, and the second tab 50 extends from the second end 105 of the electrode assembly 100. In another embodiment, the tab plate 80 may also be roughly U-shaped so that the first tab 40 and the second tab 50 extend from an identical end of the electrode assembly 100.

The disposition of the tab plate 80 is conducive to simplifying an installation process of the first tab 40 and the second tab 50.

Sixth Embodiment

Figure 13:
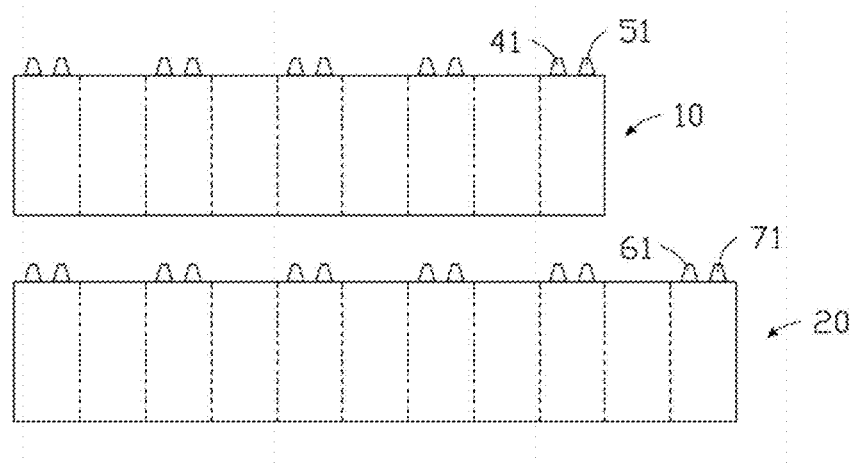
FIG. 13 is an expanded schematic structural diagram of a first electrode plate and a second electrode plate according to a sixth embodiment.
Figure 14:
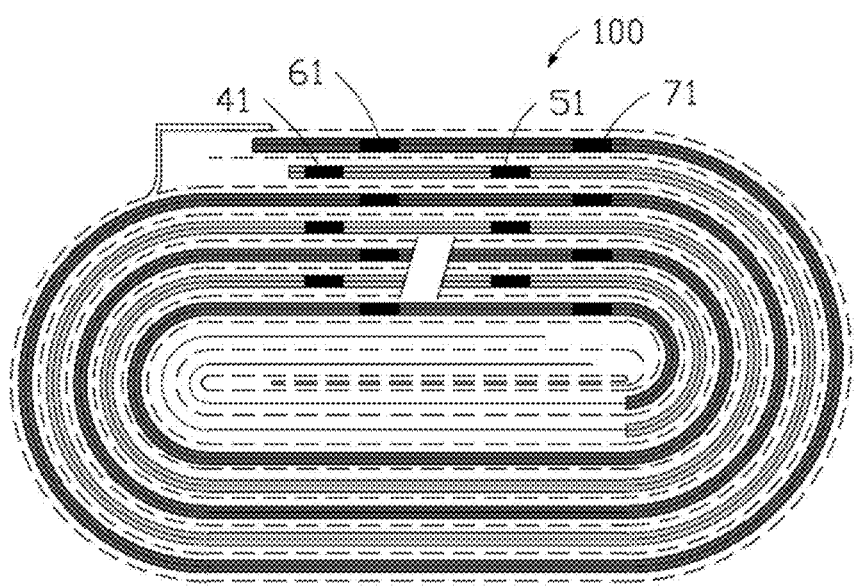
FIG. 14 is a schematic diagram of a jelly-roll structure of an electrode assembly according to a sixth embodiment.

Referring to FIG. 13 and FIG. 14, an electrode assembly 100 in the sixth embodiment is almost identical to that in the first embodiment, but differs in: in the sixth embodiment, a plurality of fourth tab units 71 are further disposed on the second electrode plate 20, and the plurality of fourth tab units 71 are stacked in the thickness direction of the electrode assembly 100 to form a fourth tab. The first tab 40, the second tab 50, the third tab 60, and the fourth tab extend from an identical end of the electrode assembly 100. The disposition of the fourth tab can further shunt the current and enhance the current-carrying capacity of the electrode assembly 100. In other embodiments, the fourth tab units 71 may also be disposed on the first tab 10. In this way, the electrode assembly 100 is provided with three negative tabs and one positive tab, or with three positive tabs and one negative tab.

Seventh Embodiment

Figure 15:
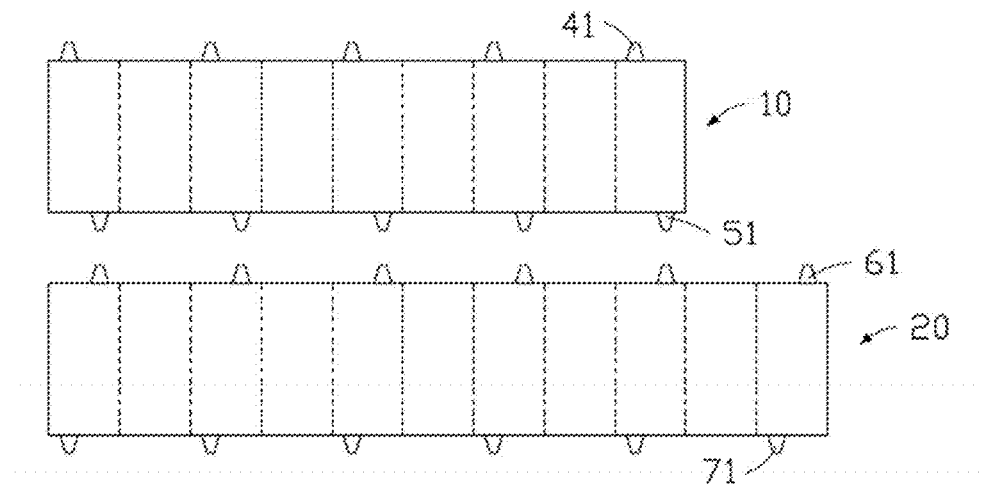
FIG. 15 is an expanded schematic structural diagram of a first electrode plate and a second electrode plate according to a seventh embodiment.
Figure 16:
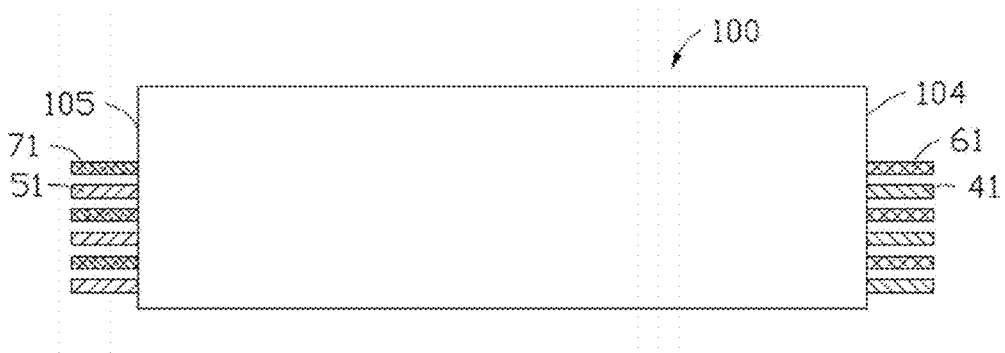
FIG. 16 is a schematic diagram of a jelly-roll structure of an electrode assembly according to a seventh embodiment.

Referring to FIG. 15 and FIG. 16, an electrode assembly 100 in the seventh embodiment is almost identical to that in the sixth embodiment, but differs in: in the seventh embodiment, in a length direction of the electrode assembly 100, the first tab 40 and the third tab 60 are located at a first end 104 of the electrode assembly 100, and the second tab 50 and the fourth tab are located at a second end 105 of the electrode assembly 100. Understandably, the third tab units 61 and the fourth tab units 71 may also be an integrally formed structure. In other embodiments, three tabs extend from one end of the electrode assembly 100 and one tab extends from the other end. The plurality of tabs may be arranged and combined according to actual application scenarios.

Eighth Embodiment

Figure 19:
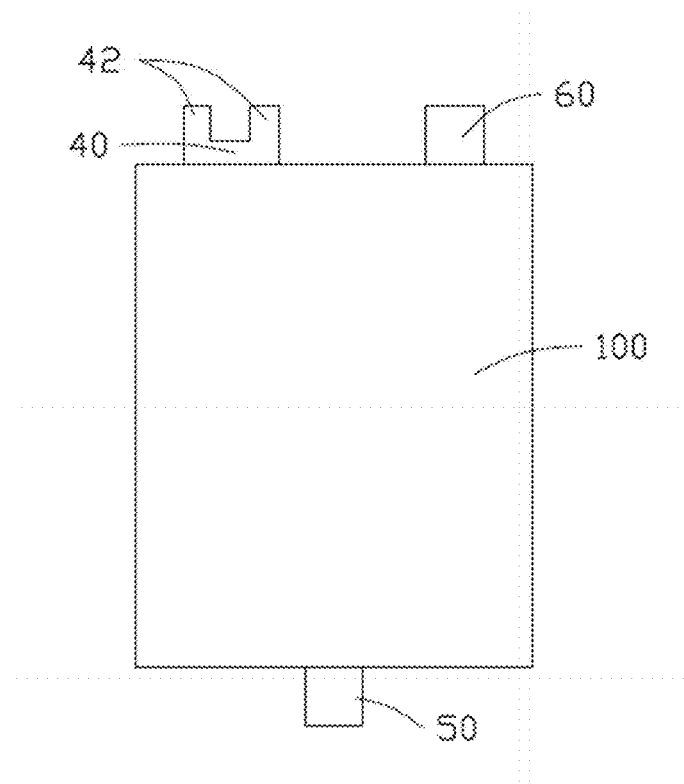
FIG. 19 is a schematic structural diagram of an electrode assembly according to an eighth embodiment.

Referring to FIG. 19, an electrode assembly 100 in the eighth embodiment is almost identical to that in the fifth embodiment, but differs in: in the eighth embodiment, two electrical connection portions 42 are disposed at an end at which the first tab 40 extends from the electrode assembly 100. The two electrical connection portions 42 are interspaced and configured to connect an external circuit or an electrical appliance. In this way, the first tab 40 is divided into two tabs of identical polarity, thereby further shunting the current and increasing the current-carrying capacity of the electrode assembly 100. The electrical connection portions 42 may be formed by welding a tab adapter onto the first tab 40, or may be formed by cutting the first tab 40. Understandably, in other embodiments, a quantity of electrical connection portions 42 on the first tab 40 may be more than two, and this application is not limited thereto. By analogy, a plurality of electrical connection portions may also be disposed on the second tab 50 and the third tab 60, and in this case, the second tab 50 is omissible.

Ninth Embodiment

Figure 20:
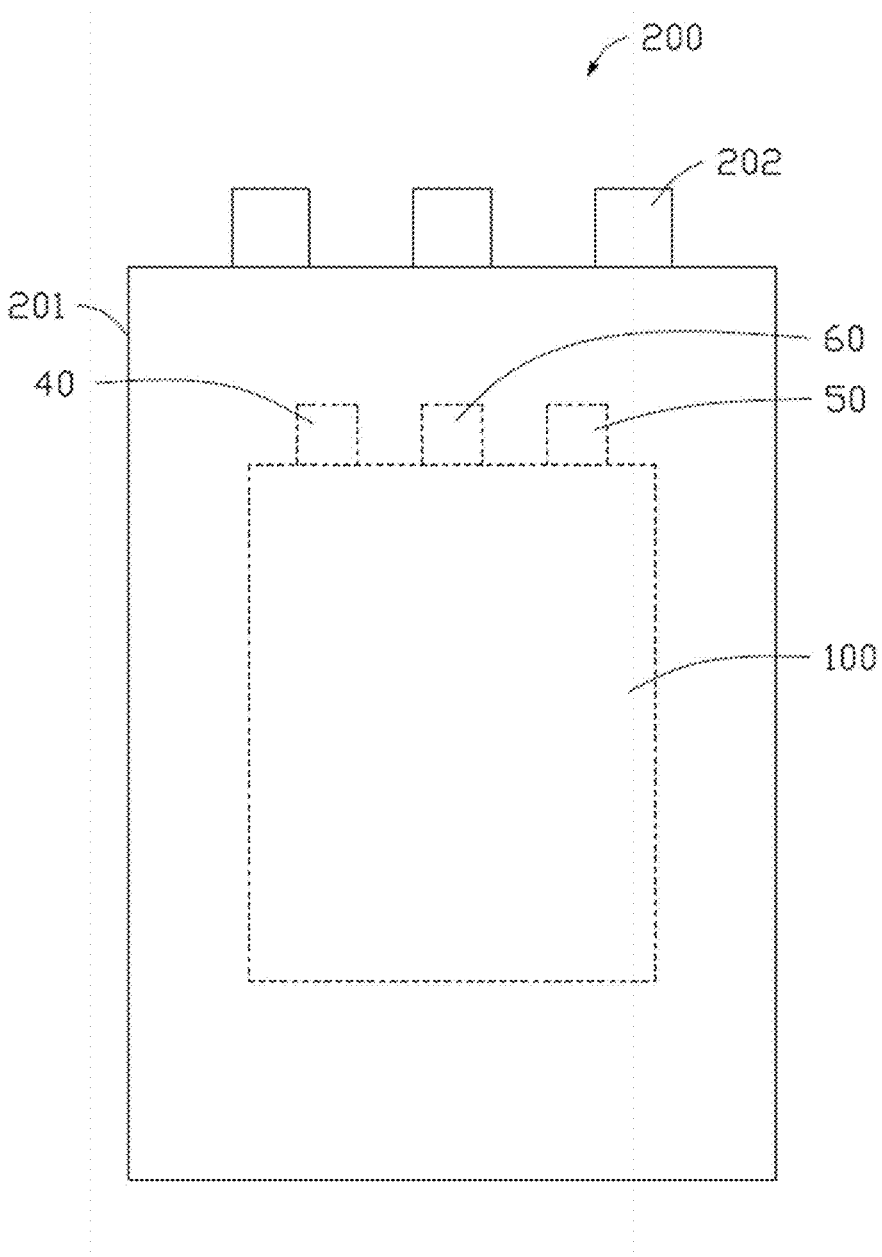
FIG. 20 is a schematic structural diagram of a battery according to a ninth embodiment.

Referring to FIG. 20, the ninth embodiment provides a battery 200, including a housing 201 and the electrode assembly 100 disclosed in any of the foregoing embodiments. The housing 201 accommodates the electrode assembly 100. Further, the battery 200 includes a plurality of electrode terminals 202 disposed on an outer surface of the housing 201, and each electrode terminal 202 is electrically connected to the first tab 40, the second tab 50, and the third tab 60 separately.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and scope of the technical solutions of this application.

What is claimed is:

1. An electrode assembly, comprising:
   a first electrode plate;
   a second electrode plate, wherein a polarity of the second electrode plate is opposite to a polarity of the first electrode plate; and
   a separator disposed between the first electrode plate and the second electrode plate; wherein,
   the electrode assembly is formed by winding the first electrode plate, the separator, and the second electrode plate;
   a plurality of first tab units and a plurality of second tab units are disposed on the first electrode plate, and
   a plurality of third tab units are disposed on the second electrode plate; and
   in a thickness direction of the electrode assembly:
      the plurality of first tab units are stacked to form a first tab, the plurality of second tab units are stacked to form a second tab, and the plurality of third tab units are stacked to form a third tab;
      projections of the first tab, the second tab, and the third tab on a projection plane perpendicular to the thickness direction of the electrode assembly are spaced apart from each other, and
      a projection of the third tab on the projection plane is located between a projection of the first tab and a projection of the second tab.

2. The electrode assembly according to claim 1, wherein the first electrode plate comprises a plurality of first winding units; the plurality of first tab units and the plurality of second tab units are distributed on the plurality of first winding units; the second electrode plate comprises a plurality of second winding units, and the plurality of third tab units are distributed on the plurality of second winding units; and each first winding unit comprises a first straight portion and a first bent portion, each second winding unit comprises a second straight portion and a second bent portion, and a plurality of first straight portions and a plurality of the second straight portions are alternately stacked.

3. The electrode assembly according to claim 2, wherein two adjacent first tab units are interspaced with a layer of the first straight portion containing no first tab unit, and the first straight portion containing no first tab unit is defined as a spacer layer.

4. The electrode assembly according to claim 3, wherein the second tab units are disposed on the spacer layers.

5. The electrode assembly according to claim 2, further comprising a winding initiation end, and the winding initiation end divides the electrode assembly into a first part and a second part in the thickness direction of the electrode assembly; and the plurality of first tab units are disposed in the first part, and the plurality of second tab units are disposed in the second part.

6. The electrode assembly according to claim 2, at least one first winding unit is provided with one first tab unit and one second tab unit.

7. The electrode assembly according to claim 2, wherein two adjacent third tab units are interspaced with at least one second winding unit.

8. The electrode assembly according to claim 2, wherein one third tab unit is disposed on each second winding unit.

9. The electrode assembly according to claim 2, wherein in a length direction of the electrode assembly, the first tab units are located at a first end of the electrode assembly, and the second tab units are located at a second end of the electrode assembly.

10. The electrode assembly according to claim 2, wherein the electrode assembly comprises a tab plate, the first tab units being configured as a first end of the tab plate, the second tab units being configured as a second end of the tab plate, the tab plate is disposed on the first winding unit, and the first end and the second end of the tab plate extend from the first winding unit.

11. The electrode assembly according to claim 1, wherein the plurality of first tab units, the plurality of second tab units, and the first electrode plate are integrally formed, and the plurality of third tab units and the second electrode plate are integrally formed.

12. The electrode assembly according to claim 1, wherein a plurality of fourth tab units are further disposed on the first electrode plate or the second electrode plate, and the plurality of fourth tab units are stacked in the thickness direction of the electrode assembly to form a fourth tab.

13. The electrode assembly according to claim 12, wherein in a length direction of the electrode assembly, the third tab is located at a first end of the electrode assembly, and the fourth tab is located at a second end of the electrode assembly.

14. The electrode assembly according to claim 1, wherein at least two electrical connection portions are disposed at an end of the first tab extending from the electrode assembly, and the at least two electrical connection portions are interspaced and configured for connection with an external circuit.

15. The electrode assembly according to claim 1, wherein a material of the first tab or the third tab is copper, nickel, or nickel-plated copper.

16. A battery, comprising a housing and an electrode assembly, the housing accommodates the electrode assembly, and the electrode assembly comprising:
   a first electrode plate;
   a second electrode plate, wherein a polarity of the second electrode plate is opposite to a polarity of the first electrode plate; and
   a separator disposed between the first electrode plate and the second electrode plate;
wherein,
   the electrode assembly is formed by winding the first electrode plate, the separator, and the second electrode plate;
   a plurality of first tab units and a plurality of second tab units are disposed on the first electrode plate, and a plurality of third tab units are disposed on the second electrode plate; and
   in a thickness direction of the electrode assembly:
      the plurality of first tab units are stacked to form a first tab, the plurality of second tab units are stacked to form a second tab, and the plurality of third tab units are stacked to form a third tab;
      projections of the first tab, the second tab, and the third tab on a projection plane perpendicular to the thickness direction of the electrode assembly are spaced apart from each other, and
      a projection of the third tab on the projection plane is located between a projection of the first tab and a projection of the second tab.

17. The battery according to claim 16, wherein the battery comprises a plurality of electrode terminals disposed on an outer surface of the housing, and each electrode terminal is electrically connected to the first tab, the second tab, and the third tab separately.

* * * * *